(12) United States Patent
Iobst et al.

(10) Patent No.: US 7,846,366 B2
(45) Date of Patent: Dec. 7, 2010

(54) METHOD FOR MOLDING COSMETIC COMPOSITE PANELS WITH VISIBLE CARBON FIBER WEAVES

(75) Inventors: Stanley A. Iobst, Troy, MI (US);
Chen-Shih Wang, Troy, MI (US);
Choongyong Kwag, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 623 days.

(21) Appl. No.: 11/735,749

(22) Filed: Apr. 16, 2007

(65) Prior Publication Data

US 2008/0088058 A1   Apr. 17, 2008

Related U.S. Application Data

(60) Provisional application No. 60/801,256, filed on May 18, 2006.

(51) Int. Cl.
*B28B 3/00*  (2006.01)

(52) U.S. Cl. ........................... 264/294; 264/257
(58) Field of Classification Search ............... 264/241, 264/257, 236, 239, 319, 320; 428/411.1, 428/413; 156/312
See application file for complete search history.

(56) References Cited

U.S. PATENT DOCUMENTS

| 3,557,408 A | * | 1/1971 | Fischer et al. ............... 425/128 |
| 4,668,460 A | * | 5/1987 | Ongena ..................... 264/255 |
| 6,071,836 A | * | 6/2000 | St. Lawrence et al. ....... 442/237 |
| 2005/0191476 A1 | | 9/2005 | Oosedo et al. |
| 2006/0038324 A1 | * | 2/2006 | Yeager et al. ............... 264/319 |

* cited by examiner

*Primary Examiner*—Christina Johnson
*Assistant Examiner*—Galen Hauth
(74) *Attorney, Agent, or Firm*—Reising Ethington P.C.

(57) ABSTRACT

One embodiment of the invention provides a method for compression molding cosmetic panels with visible carbon fiber weaves using clear or lightly filled resins. The method uses a modified, two-step compression molding process to reflow the surface of a partially cured preform of carbon fiber weave and epoxy resin.

17 Claims, 2 Drawing Sheets

METHOD FOR MOLDING COSMETIC COMPOSITE PANELS WITH VISIBLE CARBON FIBER WEAVES

CROSS-REFERENCE TO RELATED APPLICATIONS

This application claims the benefit of U.S. Provisional Application No. 60/801,256, filed May 18, 2006.

TECHNICAL FIELD

This invention relates to methods for molding cosmetic composite panels with visible carbon fiber weaves.

BACKGROUND OF THE INVENTION

Composite panels with visible carbon fiber weaves have been molded by the autoclave cure of a hand lay-up of carbon fiber/epoxy prepreg into a single-sided mold. After subassembly, if needed, the panels are coated with clear primers and/or clear topcoats to satisfy automotive surface finishing requirements while maintaining the visibility of the fiber weaves. Resin transfer molding using matched molds and dry fiber weaves is also a known method for molding such composite panels.

SUMMARY OF THE INVENTION

One embodiment of the invention includes a method for compression molding cosmetic panels with visible carbon fiber weaves using clear or lightly filled resins. The method comprises using a modified, two-step compression molding method to reflow the surface of a partially cured preform of carbon fiber weave and epoxy resin.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF AN EXEMPLARY EMBODIMENT

The following description of the embodiment(s) is merely exemplary in nature and is in no way intended to limit the invention, its application, or uses.

Figure 1:
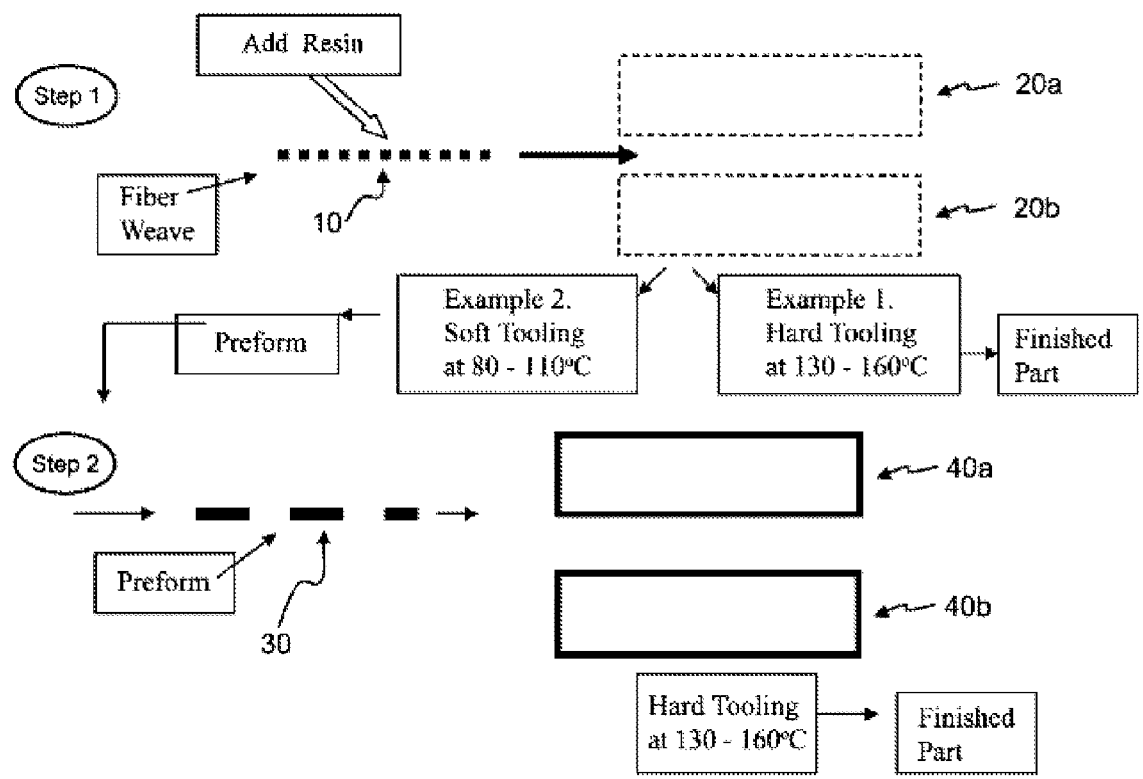
FIG. 1 illustrates a method of compression molding a fiber mat and a curable clear resin according to one embodiment of the invention.

One embodiment of the invention includes a method of compression molding cosmetic panels with visible carbon fiber weaves using clear or lightly filled resins. As shown in FIG. 1, the method comprises using a two-step compression molding method to reflow the surface of a partially cured preform of carbon fiber weave and epoxy resin. The first step includes preforming compression and the second step includes final molding.

One embodiment of the invention includes placing a fiber mat 10 and a curable resin in a first cavity of a first compression molding tool 20a, 20b. In illustrative embodiments of the invention, the fiber mat may be made from at least one of carbon fibers, glass fibers, or other synthetic or natural fibers. The fiber mat may be woven or unwoven. The fiber mat may be a carbon fiber weave, for example, TC411 2×2 Twill, available from Sigmatex High Technology Fabrics, Inc., Benicia, Calif. A first heat and a first pressure are applied to the fiber mat and the curable resin to partially cure the resin to a semisolid state to provide a preform. For example, about 10 to about 60 percent of the reactive groups of the curable resin may cure under the first heat and first pressure. In one embodiment, 25 percent of the curable resin may cure under the first heat and first pressure. The first pressure may range from about 0.2 MPa to about 0.5 MPa. The applying of the first heat may result in the material being exposed to a temperature ranging from about 80° C. to about 110° C. The curable resin may be cured at the first heat and first pressure for about 5 minutes to about 30 minutes.

Next, the preform 30 is placed in a second cavity of a second compression molding tool 40a, 40b. A second heat and a second pressure are applied to the preform to reflow at least a portion of the curable resin and to cure any uncured portion of the curable resin to form a composite panel. The curable resin may be cured at the second heat and second pressure for about 5 minutes to about 60 minutes. The composite panel has a substantially transparent resin layer over the fiber mat, and at least portions of the fiber mat are visible through the resin layer. The composite panel may be substantially free of fiber readout. The thickness of the composite panel may range from about 1.0 mm to about 3.0 mm.

The second pressure is higher than the first pressure. In one embodiment, the second pressure is significantly higher than the first pressure. The second pressure may range from about 1.0 MPa to about 2.0 MPa. The applying of the second heat may result in the fiber mat and the curable resin being exposed to a temperature range of about 130° C. to about 160° C.

In one embodiment, the second cavity is thinner than the first cavity. This adjustment in the thickness may be accomplished in many different ways. In one embodiment, the thickness adjustment may be accomplished by using a separate lower cost tool for the preform. The first compression molding tool may be a lower cost tool and the second compression molding tool may be a separate higher cost tool with tight dimensional precision. The first compression molding tool may be a soft tool of less precise surface definition than the second compression molding tool. For example, the first compression molding tool 20a, 20b may be a soft tool made from relatively soft material such as glass or carbon fiber-epoxy laminates and zinc alloys. The second compression molding tool 40a, 40b may have a high quality surface for the finish molding.

In another embodiment, the first compression molding tool and the second compression molding tool may be the same tool. If the same tool is used for both steps, then the mold may be designed to close to two different gaps. The first cavity may close to a first gap and the second cavity may close to a second gap. In another embodiment, spacers are used in the cavity of the compression molding tool to create two different thicknesses. A first spacer may be placed in the first cavity to create a first gap. A second spacer may be placed in the second cavity to create a second gap. The first gap may be larger than the second gap.

Another embodiment of the invention uses a collapsing mold to create two different thicknesses. At the preforming stage, a series of air or hydraulic cylinders may hold the mold open the extra thickness needed for the preform molding. The cylinders may hold the compression molding tool open the distance of a first gap. Then for the final part molding, the pressure may be released on the cylinders and the mold may close to the design intent thickness for the part.

In another embodiment, the compression molding tool is built to the preform thickness and then a disposable shim of plastic film or a disposable film of aluminum sheeting is used to compress the preform in the second cavity for the final molding.

In another embodiment, the fiber mat may be impregnated with the curable resin before the fiber mat and curable resin (the resin impregnated fiber mat) are placed in the first cavity of the first compression molding tool.

In one embodiment, the curable resin may include an epoxy comprising at least one diglycidyl ether of bisphenol-A resin. For example, the curable resin may comprise DER 383 Epoxy Resin, available from Dow. In various embodiments of the invention, the curable resin compositions include an epoxy resin which may have an average molecular weight ranging from about 300 to about 1200, may have an average number of repeating units ranging from about 0.1 to about 2.5, and/or may be present in an amount of about 30 to about 80 weight percent.

The curable resin may further comprise a hardener, for example an anhydride. The anhydride may be methyl tetrahydrophthalic anhydride 600, a curing agent available from Lonza Group. The anhydride may also be methyl hexahydrophthalic anhydride.

The curable resin may further include a filler. In one embodiment of the invention the filler may include nanoparticles, such as silica or titanium dioxide based nanoparticles. In one embodiment the filler may include a nanoparticle dispersion, for example silica nanoparticles in a diglycidyl ether of bisphenol-A epoxy resin. In one embodiment of the invention, the nanoparticles in the dispersion may range from about 10 to about 45 weight percent. In one embodiment of the invention, the nanoparticles may be present in an amount of about 0 to about 30 weight percent. In one embodiment, the silica particles may be present in an amount of about 40 weight percent of a diglycidyl ether of bisphenol-A epoxy based dispersion, wherein the silica particles have a diameter range of about 5 nanometers to about 35 nanometers. One example of a suitable nanoparticle dispersion is Nanopox F400, available from Hanse Chemie AG. Epoxy compositions containing Nanopox F400 may be transparent because the nano-sized particles are too small to scatter the visible light. The resulting composite panels may be visible carbon fiber composite panels with further reduced fiber readout since silica particles can be used to reduce cure shrinkage and coefficient of thermal expansion (CTE) of the resin mixtures.

In another embodiment, the nanoparticle filler may comprise a solvent based nano dispersion, for example nanoparticles in methyl ethyl ketone, or methyl alcohol, or isopropyl alcohol. The use of a solvent based nanoplarticle dispersion in an epoxy formulation, however, may require an extra procedure to remove the solvent, which would be a contaminant in the final composite material, in order to obtain a composite with desired mechanical and thermal properties.

In another embodiment, the curable resin may further comprise a catalyst. The catalyst may be an amine based catalyst. For example, the catalyst may comprise N,N-Benzyldimethylamine (BDMA), available from Aldrich. In one embodiment the catalyst may be present in amount of about 0.4 to about 2.0 weight percent.

To demonstrate embodiments of the invention, carbon fiber composite panels were prepared using materials and methods described in the following examples.

Material Preparation and Testing

Ingredients used in the examples are summarized in the following table:

| Component | Composition I (Parts) | Composition II (Parts) (15 wt % Nano Silica) | Composition III (Parts) (26 wt % Nano Silica) |
| --- | --- | --- | --- |
| DER 383 Epoxy Resin (Dow) | 100 | 100 | 0 |
| Methyl Tetrahydrophthalic Anhydride 600 Curing Agent (Lonza AG) | 80 | 159 | 80 |
| N,N-Benzyldimethylamine (BDMA) Catalyst (Aldrich) | 2 | 4 | 2 |
| Nanopox F400 Dispersion (Hanse Chemie AG) | 0 | 162 | 167 |

Material Performance

EXAMPLE 1

The first example is the control procedure of conventional compression molding. Two pieces of carbon fiber mat (TC411 2×2 Twill, T700S, 12K carbon fiber, 385 gsm FAW, available from Sigmatex High Technology Fabrics, Inc., Benicia, Calif.) were cut to size (254 mm×254 mm) and stacked up to form the preform. The preform was saturated with the epoxy resin mixture Composition I to form a resin impregnated preform. The resin impregnated preform was placed in the preheated mold (254 mm×254 mm×1.1 mm) to cure. The resin may be added to the preform either inside or outside of the mold. The resin in this example was cured at 140° C. for 20 minutes under 1.5 MPa pressure to form a 1.1 mm thick visible carbon fiber panel.

EXAMPLE 2

The second example is the new two-step compression molding method. In step 1 of this method, two pieces of dry carbon fiber weave (TC411 2×2 Twill) were placed into the preform mold (254 mm×254 mm×1.1 mm). The preform mold may be a soft tool of less precise surface definition than the mold in Example 1. The same resin, Composition I, was distributed through the fiber preform under 0.4 MPa pressure. The resin was then cured at 100° C. for 10 minutes to form a 1.1 mm thick, partially cured (approximately 25%) preform. At step 2, the partially cured preform was transferred to the final cure mold (254 mm×254×1.0 mm, with a high quality surface) for the finish molding at the same conditions as used in Example 1 (140° C. for 20 minutes under 1.5 MPa pressure). During the cure molding in the finish tooling, the surface reflows to give a 1.0 mm thick visible carbon fiber composite panel with an improved surface quality.

EXAMPLE 3

In the third example, the two-step compression molding method described above in Example 2 was used with two epoxy resin compositions filled with 15 wt % nano silica (Composition II) and 26 wt % nano silica (Composition III). The source of the nano silica was Nanopox F400, a diglycidyl ether of bisphenol-A epoxy based dispersion consisting of 40 wt % of 5-35 nm diameter silica particles. The silica particles may reduce cure shrinkage and coefficient of thermal expansion (CTE) of the resin mixtures, as shown in the following table. The cure shrinkage (vol %) of the resin compositions was determined by comparing the measured densities of liquid (before curing) and solid (after curing) resins.

| Composition | Cure Shrinkage (vol %) | CTE (/° C. × $10^{-6}$) |
|---|---|---|
| I | 2.0 | 60 |
| II | 0.9 | 55 |
| III | 0.6 | 50 |

The two nano filled epoxy compositions were molded into 1.0 mm thick visible carbon fiber panels using the same carbon fiber weaves and the two-step compression molding procedures and conditions as described in Example 2 above.

The levels of fiber readout of the resulting cured composite panels from Examples 1-3 were evaluated by the Wyko surface profilometer, a non-contact, optical method to measure surface roughness, Ra. The results are shown in the following table. Since these panels were made with a transparent resin, the surface was coated with a sputtered 0.05 μm layer of gold to give a reflective surface for the instrument to measure.

| | Example 1/ Composition I | Example 2/ Composition I | Example 3/ Composition II | Example 3/ Composition III |
|---|---|---|---|---|
| Ra (μm) | 1.04 | 0.86 | 0.84 | 0.68 |

The two-step compression molding method can effectively reduce the fiber readout of visible carbon fiber composite panels as indicated by the smaller Ra values measured. The reduction becomes even more significant when the method is combined with nano filled epoxy resins.

It should be noted that the compositions disclosed are representative. The compositions are expected to work as well or better within a range of the concentration of each component.

Figure 2:
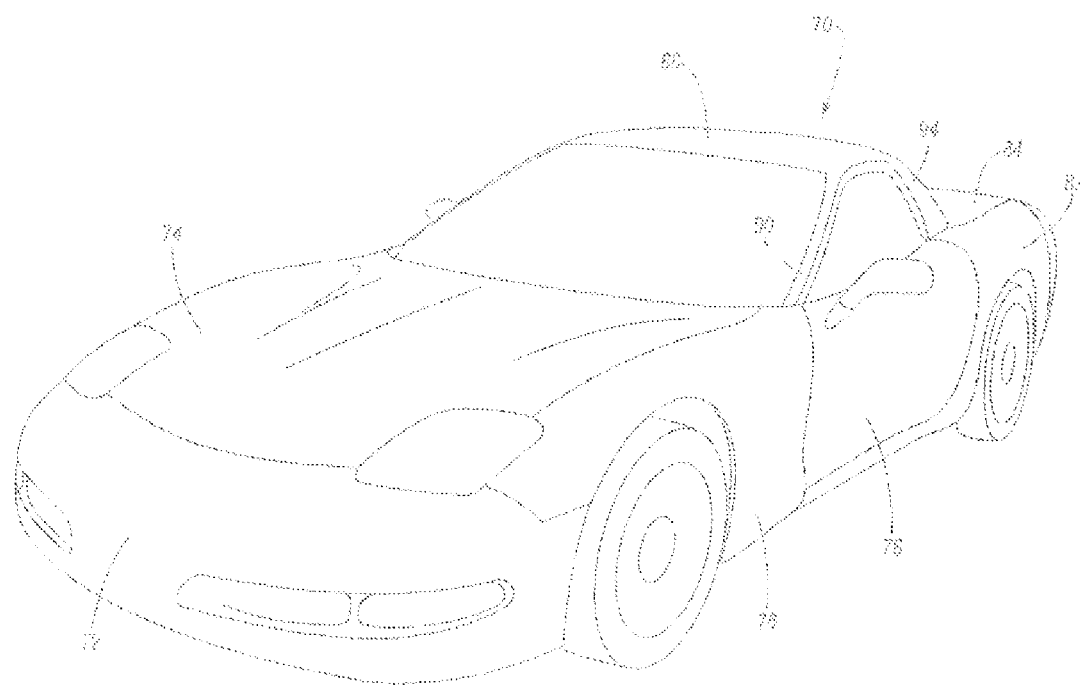
FIG. 2 illustrates a product including molded composite panels according to one embodiment of the invention.

Referring now to FIG. 2, in one embodiment of the invention, molded composite panels, as described above, may be utilized to form body panels of a vehicle 70 including, but not limited to, the front fascia 72, hood 74, front fender 76, front door 78, rear doors (if present), rear fenders 82, trunk lid 84, roof 88, and pillars 90 and 94. The molded composite panels may be attached to the vehicle body (not shown) which is attached to a vehicle frame (not shown) in a manner known to those skilled in the art.

Other suitable compositions include those disclosed in Assignee's co-pending application entitled "Molding Cosmetic Composite Panels With Visible Fibers From Ultraviolet Light Resistant Epoxy Compositions".

The above description of embodiments of the invention is merely exemplary in nature and, thus, variations thereof are not to be regarded as a departure from the spirit and scope of the invention.

What is claimed is:

1. A method comprising:
    placing a fiber mat and a curable resin in a first cavity of a first compression molding tool, the first cavity being at least partially defined by a first gap when the first compression molding tool is closed;
    applying a first heat and a first pressure to the fiber mat and the curable resin to partially cure the resin to a semisolid state to provide a preform;
    placing the preform in a second cavity of a second compression molding tool, the second cavity being at least partially defined by a second gap when the second compression molding tool is closed, and wherein the second gap is smaller than the first gap; and
    applying a second heat and a second pressure to the preform to reflow at least a portion of the curable resin and cure any uncured portion of the curable resin to form a composite panel having a substantially transparent resin layer over the fiber mat, and wherein at least portions of the fiber mat are visible through the resin layer, wherein the second pressure is higher than the first pressure, and wherein the second compression molding tool has a higher quality surface finish than the first compression molding tool.

2. A method as set forth in claim 1 wherein the first pressure ranges from about 0.2 MPa to about 0.5 MPa.

3. A method as set forth in claim 1 wherein the second pressure ranges from about 1.0 MPa to about 2.0 MPa.

4. A method as set forth in claim 1 wherein the composite panel is substantially free of fiber readout.

5. A method as set forth in claim 1 further comprising impregnating the fiber mat with the curable resin before placing the fiber mat and curable resin in the first cavity of the first compression molding tool.

6. A method as set forth in claim 1 wherein the curable resin comprises an epoxy comprising at least one diglycidyl ether of bisphenol-A resin.

7. A method as set forth in claim 6 wherein the epoxy resin has an average molecular weight ranging from about 300 to about 1200.

8. A method as set forth in claim 6 wherein the epoxy resin has an average number of repeating units ranging from about 0.1 to about 2.5.

9. A method as set forth in claim 6 wherein the epoxy is about 30 to about 80 weight percent of the curable resin.

10. A method as set forth in claim 6 wherein the curable resin further comprises a hardener.

11. A method as set forth in claim 6 wherein the curable resin further comprises a nanoparticle filler.

12. A method as set forth in claim 11 wherein the nanoparticle filler comprises a digylcidyl ether of bisphenol-A epoxy based dispersion comprising about 40 weight percent of silica particles, wherein the silica particles have a diameter range of about 5 nanometers to about 35 nanometers.

13. A method as set forth in claim 6 wherein the curable resin further comprises a catalyst.

14. A method as set forth in claim 1 wherein the fiber mat comprises at least one of carbon fibers, glass fibers, synthetic fibers, or natural fibers.

15. A method as set forth in claim 1 wherein applying the first heat results in the fiber mat and the curable resin being exposed to a temperature ranging from about 80° C. to about 110° C.

16. A method as set forth in claim 1 wherein applying the second heat results in the fiber mat and the curable resin being exposed to a temperature ranging from about 130° C. to about 160° C.

17. A method comprising:

placing a fiber mat and a curable resin in a first cavity of a first compression molding tool, the first cavity being at least partially defined by a first gap when the first compression molding tool is closed;

applying a first heat and a first pressure to the fiber mat and the curable resin to partially cure the resin to a semisolid state to provide a preform, the first pressure ranging from 0.2 MPa to 0.5 MPa;

placing the preform in a second cavity of a second compression molding tool, the second compression molding tool being the same tool as the first compression molding tool, the second cavity being at least partially defined by a second gap when the second compression molding tool is closed, and wherein the second gap is smaller than the first gap; and applying a second heat and a second pressure to the preform to reflow at least a portion of the curable resin and to cure any uncured portion of the curable resin to form a composite panel having a substantially transparent resin layer over the fiber mat, the second pressure ranging from 1.0 MPa to 2.0 MPa, and wherein at least portions of the fiber mat are visible through the resin layer; and forming the first gap and the second gap of the first and second cavities by one of the following: (1) placing a first spacer in the first cavity to create the first gap and placing a second spacer in the second cavity to create the second gap; (2) holding the first compression molding tool open to form the first gap using one of a series of air cylinders or a series of hydraulic cylinders and holding the second compression molding tool open to form the second gap; or (3) using one of a disposable shim of plastic film or a disposable shim of aluminum sheeting to compress the preform in the second cavity of the second compression molding tool.

* * * * *